(12) United States Patent
Chung et al.

(10) Patent No.: US 12,411,730 B2
(45) Date of Patent: Sep. 9, 2025

(54) MEMORY SYSTEM INCLUDING DATA-WIDTH AWARE ENCODER AND DATA-WIDTH AWARE DECODER AND OPERATING METHOD THEREOF

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Sungwoo Chung, Seoul (KR); Youngseo Lee, Seoul (KR)

(73) Assignees: SAMSUNG ELECTRONICS CO., LTD., Suwon-si (KR); INDUSTRY-ACADEMIC COOPERATION, YONSEI UNIVERSITY, Seoul (KR)

( * ) Notice: Subject to any disclaimer, the term of this patent is extended or adjusted under 35 U.S.C. 154(b) by 188 days.

(21) Appl. No.: 18/102,187

(22) Filed: Jan. 27, 2023

(65) Prior Publication Data
US 2023/0259422 A1    Aug. 17, 2023

(30) Foreign Application Priority Data
Feb. 17, 2022   (KR) .................. 10-2022-0021042

(51) Int. Cl.
*G06F 11/10*   (2006.01)

(52) U.S. Cl.
CPC ................. *G06F 11/1044* (2013.01)

(58) Field of Classification Search
CPC ............ G06F 11/1044; G06F 11/1048; G06F 11/1032; G06F 3/0608; G06F 3/0619; G06F 11/1024

(Continued)

(56) References Cited

U.S. PATENT DOCUMENTS 8,015,473 B2   9/2011   Eilert et al.
9,570,197 B2 *  2/2017   Nishiyama ............ G06F 11/073
(Continued)

FOREIGN PATENT DOCUMENTS

JP        4953648 B2       6/2012
KR     10-1027202 B1       4/2011
KR   10-2021-0034726 A     3/2021

OTHER PUBLICATIONS

Stealth ECC: A Data-Width Aware Adaptive ECC Scheme for DRAM Error Resilience; Sung Woo Chung et al.; IEEE; Mar. 2022,; pp. 382-387.*

(Continued)

*Primary Examiner* — Albert Decady
*Assistant Examiner* — Osman M Alshack
(74) *Attorney, Agent, or Firm* — Sughrue Mion, PLLC

(57) ABSTRACT

A memory system includes a memory module and a memory controller. The memory module stores a code word group including first and second data words and a flag. The memory controller includes an error correction code (ECC) engine including a data-width aware (DWA) encoder that generates the code word group by using the first and second data words, and performs an error detection and error correction operation in one of first to third modes based on a size of each of the first and second data words, and a DWA decoder that receives the code word group, performs an error detection and error correction operation in one of the first to third modes according to a type of the code word group determined based on the flag, and extracts the first data word and the second data word from the code word group.

13 Claims, 12 Drawing Sheets

(58) Field of Classification Search
USPC .................................................. 714/763, 767
See application file for complete search history.

(56) References Cited

U.S. PATENT DOCUMENTS

| | | | |
|---|---|---|---|
| 10,176,038 B2 | 1/2019 | Jeganathan et al. | |
| 10,404,286 B2* | 9/2019 | Sin .................... | G06F 11/1048 |
| 10,846,171 B2 | 11/2020 | Cho et al. | |
| 10,917,111 B2 | 2/2021 | Kim et al. | |
| 11,157,358 B2 | 10/2021 | Song et al. | |
| 2010/0223525 A1* | 9/2010 | Wuu ................. | H03M 13/2927 |
| | | | 714/755 |
| 2013/0227368 A1* | 8/2013 | Ramaraju ............ | H03M 13/00 |
| | | | 714/E11.023 |
| 2015/0222291 A1* | 8/2015 | Kokubun ........... | H03M 13/1142 |
| | | | 714/764 |
| 2018/0211696 A1* | 7/2018 | Kim ...................... | G11C 11/418 |
| 2020/0065189 A1* | 2/2020 | Park ....................... | G11C 29/52 |
| 2020/0135292 A1* | 4/2020 | Kim ..................... | G11C 29/783 |
| 2020/0192754 A1* | 6/2020 | Cho .................. | H03M 13/1575 |
| 2020/0371872 A1* | 11/2020 | Fuller .................... | G11C 29/52 |
| 2020/0394102 A1* | 12/2020 | Cha ..................... | G06F 11/1068 |
| 2021/0311824 A1* | 10/2021 | Fackenthal ......... | G11C 11/2273 |
| 2022/0189574 A1* | 6/2022 | Amato .................. | G11C 29/44 |

OTHER PUBLICATIONS

S. Cha et al., "Defect analysis and cost-effective resilience architecture for future DRAM devices," in IEEE HPCA, Feb. 2017, pp. 61-72 (Total 13 pages).

X. Jian and R. Kumar, "Adaptive reliability chipkill correct (arcc)," in IEEE HPCA, Feb. 2013, Total 13 pages.

J. Kong and S. W. Chung, "Exploiting narrow-width values for process variation tolerant 3-D microprocessors," in DAC, 2012, pp. 1197-1206.

N. Rohbani et al., "NVDL-cache: Narrow-width value aware variable delay low-power data cache," in IEEE ICCD, Nov. 2019, pp. 264-272 (Total 10 pages).

* cited by examiner

FIG. 3
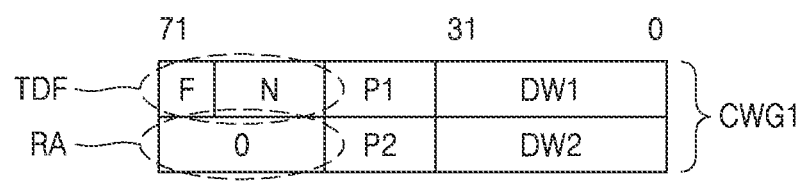
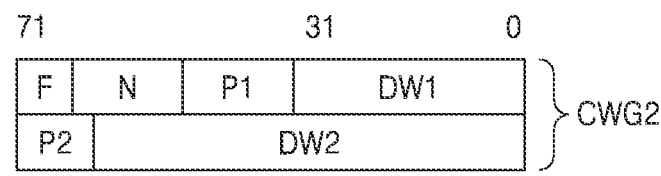
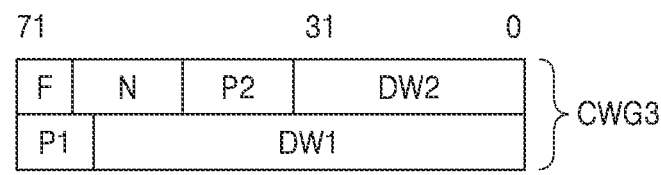
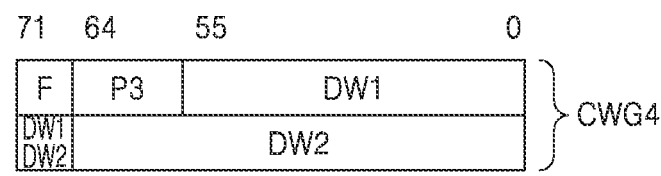

FIG. 6

| TDF | F Flag | N Flag |
|---|---|---|
| CWG1 | 0000000 | 0000000<br>0000000 |
| CWG2 | 0000000 | 1111111<br>1111111 |
| CWG3 | 0000000 | 1111111<br>0000000 |
| CWG4 | 1111111 | -- |

MEMORY SYSTEM INCLUDING DATA-WIDTH AWARE ENCODER AND DATA-WIDTH AWARE DECODER AND OPERATING METHOD THEREOF

CROSS-REFERENCE TO RELATED APPLICATION

This application is based on and claims priority under 35 U.S.C. § 119 from Korean Patent Application No. 10-2022-0021042, filed on Feb. 17, 2022, in the Korean Intellectual Property Office, the disclosure of which is incorporated by reference herein in its entirety.

BACKGROUND

The present disclosure relates to a memory system and an operating method of the memory system, and more particularly, to a memory system including a data-width aware (DWA) encoder and a DWA decoder, and an operating method of the memory system.

Memory systems may include various types of memory modules. Memory processing is configured to be performed on a single memory, so that the performance and characteristics of the memory processing may be determined by the single memory. Application processing that requires a large memory capacity may utilize a high-capacity memory, such as a dual in-line memory module (DIMM). A DIMM may include a plurality of dynamic random access memory (DRAM) chips implemented on a printed circuit board (PCB). A controller of a memory system may provide reliability availability serviceability (RAS) functions of DRAM chips.

Recently, as the manufacturing technology of DRAM has been refined and the storage capacity per unit area has increased, the reliability problem of memory devices has become more important. To satisfy a DRAM reliability level, a memory system, which adopts DIMMs that may store error correction code (ECC) information and uses a single error correction, double error detection (SECDED) code using a 8-bit parity per 64-bit data or uses an ECC technique (e.g., chipkill) that provides higher reliability than the SECDED code, has been provided. In this case, however, an additional storage space is inevitably required, and therefore, a memory system providing high reliability, without requiring an additional storage space, is advantageous.

SUMMARY

It is an aspect to provide a memory system and an operating method of the memory system that provide high reliability, without requiring an additional storage space.

According to an aspect of one or more embodiments, there is provided a memory system comprising a memory module configured to store a code word group including a first data word, a second data word different from the first data word, and a type determination flag indicating a size of each of the first data word and the second data word; and a memory controller configured to control an operation of the memory module, the memory controller including an error correction code (ECC) engine configured to detect and correct an error of the code word group. The ECC engine includes a data-width aware (DWA) encoder configured to generate the code word group by using the first data word and the second data word received from outside of the memory controller, and perform an error detection and error correction operation in one of a first mode, a second mode, and a third mode according to a type of the code word group determined based on the size of each of the first data word and the second data word; and a DWA decoder configured to receive the code word group from the memory module, perform an error detection and error correction operation in one of the first mode, the second mode, and the third mode according to a type of the code word group determined based on the type determination flag, and extract the first data word and the second data word from the code word group.

According to another aspect of one or more embodiments, there is provided an error correction code (ECC) engine comprising a data-width aware (DWA) encoder configured to generate a code word group using a first data word and a second data word received from outside the ECC engine, and perform an error detection and error correction operation by selecting one of a plurality of error correction modes based on a size of each of the first data word and the second data word; and a DWA decoder configured to perform an error detection and error correction operation by selecting one of the plurality of error correction modes based on the size of each of the first data word and the second data word, and extract the first data word and the second data word from the code word group.

According to another aspect of one or more embodiments, there is provided an operating method of a memory system, the operating method comprising receiving a first data word and a second data word; generating a code word group including the first data word and the second data word based on a size of each of the first data word and the second data word; selecting an error correction mode based on a type determination flag indicating the size of each of the first data word and the second data word; and performing an error detection and error correction operation in the error correction mode that is selected.

BRIEF DESCRIPTION OF THE DRAWINGS

Embodiments will be more clearly understood from the following detailed description taken in conjunction with the accompanying drawings in which:

FIG. 3 is a diagram illustrating a code word group provided by an ECC engine according to an embodiment;

FIG. 6 is a diagram illustrating a type determination flag according to an embodiment;

DETAILED DESCRIPTION

Figure 1:
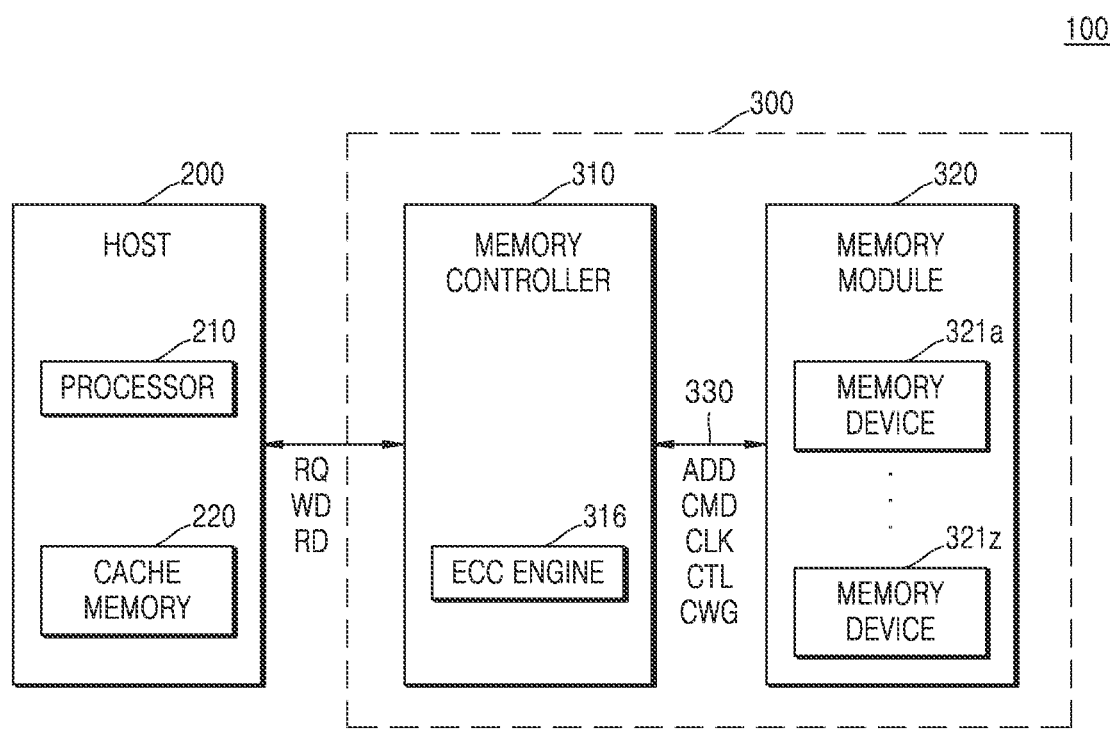
FIG. 1 is a block diagram illustrating a computing system according to an embodiment.

Hereinafter, various embodiments are described in detail with reference to the accompanying drawings. When describing with reference to the drawings, the same or corresponding components are given the same reference numerals, and repeated description thereof is omitted for conciseness.

FIG. 1 is a block diagram illustrating a computing system 100 according to an embodiment.

Referring to FIG. 1, the computing system 100 may refer to a system, such as a computer, a notebook computer, a server, a workstation, a portable communication terminal, a personal digital assistant (PDA), a portable multimedia player (PMP), a smartphone, a wearable device, and the like. The computing system 100 may include a host 200 and a memory system 300.

The host 200 may be a data processing device. The host 200 may execute an operating system (OS) and/or various applications. For example, the host 200 may be implemented as a system-on-a-chip (SoC). The host 200 may control a data processing operation of the memory system 300. The host 200 may include a processor 210 and a cache memory 220. The host 200 may include at least one processor. For example, the host 200 may include a multi-core processor.

The processor 210 may include one or more of a central processing unit (CPU), a digital signal processor (DSP), a graphics processing unit (GPU), an application processor (AP), an encryption processing unit, a physics processing unit, a machine learning processing unit, and the like. The processor 210 may perform a data operation by using the cache memory 220. The cache memory 220 may store data to be written to the memory system 300 or data read from the memory system 300.

The host 200 may communicate with the memory system 300 through at least one channel. An interface used for communication between the host 200 and the memory system 300 may be determined according to a protocol or a specification. For example, the host 200 may communicate with the memory system 300 by using an interface protocol, such as an advanced technology attachment (ATA) interface, a serial ATA (SATA) interface protocol, a parallel ATA (PATA) interface protocol, a peripheral component interconnection (PCI) interface protocol, a PCI express (PCIe) interface protocol, a serial attached SCSI (SAS) interface protocol, a universal serial bus (USB) interface protocol, a multi-media card (MMC) interface protocol, an enhanced small disk interface (ESDI) interface protocol, an integrated drive electronics (IDE) interface protocol, and the like.

In FIG. 1 and the following drawings, write data WD and read data RD exchanged between the host 200 and the memory system 300 may be collectively referred to as a 'data word'. A data word input to the memory system 300 may be referred to as write data WD, and a data word output from the memory system 300 may be referred to as output data RD. The write data WD and the output data RD may be the same as each other or different from each other.

The memory system 300 may include a memory controller 310 and a memory module 320. The memory module 320 and the memory controller 310 may be communicatively connected through a bus 330. Although the memory system 300 of FIG. 1 is illustrated as including one memory controller 310 and one memory module 320, this illustration is for convenience of description and embodiments are not limited thereto. For example, in some embodiments, the memory system 300 may include a plurality of memory modules and/or a plurality of memory controllers. Also, although the memory controller 310 of FIG. 1 is described as being separate from the host 200, embodiments are not limited thereto. For example, in some embodiments, the memory controller 310 may be described as being provided in the processor 210 of the host 200 and the processor 210 may be described as controlling the memory module 320.

The memory controller 310 may control an operation of the memory system 300. The memory controller 310 may control the memory module 320 according to a request RQ from the host 200. The memory controller 310 may control a write operation and a read operation of each of memory devices 321a to 321z included in the memory module 320 by providing a command CMD and an address ADD to the memory module 320. Also, the memory controller 310 may control the memory system 300 to perform an internal management operation or a background operation of the memory system 300 regardless of the request RQ from the host 200. The memory controller 310 may be implemented using an SoC, an application specific integrated circuit (ASIC), a field programmable gate array (FPGA), or the like.

The memory controller 310 may include an ECC engine 316. The ECC engine 316 may perform an error detection operation and an error correction operation on the data words WD and RD. The ECC engine 316 may include a circuit, a system, or a device for performing an error detection operation and an error correction operation. To detect and correct errors of the data words WD and RD, the ECC engine 316 may use at least one of a parity check, a cyclical redundancy code (CRC) check, a checksum check, and a hamming code, and may use a method, such as ×4 single device data correction (SDDC), ×8 SECDED, and lockstep ×8 SDDC.

The ECC engine 316 may generate a code word group CWG with respect to a data word that is input as the write data WD, and may perform an error detection and error correction operation on the code word group CWG. In FIG. 1 and the following drawings, an operation of generating a code word group CWG by the ECC engine 316, based on the write data WD, and performing an error detection and error correction operation for the generated code word group CWG may be referred to as 'error correction encoding'.

The ECC engine 316 may perform the error detection and error correction operation on the code word group CWG received from the memory module 320, and extract a data word to be output as read data RD from the code word group CWG. In FIG. 1 and the following drawings, the operation of the ECC engine 316 performing the error detection and error correction operation on the code word group CWG and extracting a data word output as read data RD from the code word group CWG may be referred to as 'error correction decoding'.

The ECC engine 316 may have a certain level of error correction capability. For example, when a number of error bits present in the write data does not exceed the error correction capability, the ECC engine 316 may detect and correct an error included in the write data. A maximum number of error bits that does not exceed the error correction capability of the ECC engine 316 may be referred to as a 'maximum number of allowable error bits'. For example, in some embodiments, the maximum number of allowable error bits of the ECC engine 316 may be at least one bit for one code word group (CWG in FIG. 1) or may be up to six bits for one code word group (CWG). However, the maximum number of allowable error bits of the ECC engine 316 according to embodiments are not limited thereto. For example, in some embodiments, the maximum number of allowable error bits of the ECC engine 316 may be eight or more bits. As the maximum number of allowable error bits increases, the error correction effect may increase.

The code word group CWG may include a plurality of data words and a parity bit and a type determination flag. For example, in some embodiments, the code word group CWG may include a first data word, a second data word, parity bits and a type determination flag for the first data word and the second data word. The type determination flag may indicate the size of each of the first data word and the second data word. The ECC engine 316 may determine the type determination flag based on the size of each of the first data word and the second data word, and may determine the type of the code word group CWG based on the type determination flag. The structure and type of the code word group CWG are described in more detail with reference to FIG. 3 to be described below.

The ECC engine 316 may perform the error detection and error correction differently depending on the determined type of the code word group CWG. For example, the ECC engine 316 may perform an error detection and error correction operation in any one of a first mode, a second mode, and a third mode according to the determined type of the code word group CWG. The operation of the ECC engine 316 is described in more detail with reference to the drawings to be described below.

The memory module 320 may store the code word group CWG received from the memory controller 310. The memory module 320 may be implemented as a single in-line memory module (SIMM), a dual in-line memory module (DIMM), a small-outline DIMM (SODIMM), an unbuffered DIMM (UDIMM), a fully-buffered DIMM (FBDIMM), a rank-buffered DIMM (RBDIMM), a mini-DIMM, a micro-DIMM, a registered DIMM (RDIMM), a load-reduced DIMM (RDIMM), or the like.

The memory module 320 may include the memory devices 321a to 321z. Each of the memory devices 321a to 321z may include a volatile memory, such as dynamic random access memory (DRAM), synchronous DRAM (SDRAM), double data rate SDRAM (DDR SDRAM), low power double data rate SDRAM (LPDDR SDRAM), rambus DRAM (RDRAM), or a non-volatile memory, such as a volatile memory, such as phase-change RAM (PRAM), magneto-resistive RAM (MRAM), resistive RAM (ReRAM), ferro-electric RAM (FRAM), flash memory, or the like. Each of the memory devices 321a to 321z may be implemented to input/output data through N input/output (I/O) pins (N being a natural number greater than or equal to 2).

Each of the memory devices 321a to 321z may operate according to a data bus width characteristic. A data bus width of each of the memory devices 321a to 321z may be 4 bits (×4), 8 bits (×8), 16 bits (×16), or 32 bits (×32). For example, a memory device having a 4-bit data bus width (hereinafter, referred to as an '×4 memory device') may transmit and receive data to and from the memory controller 310 through four I/O pins, and a memory device having an 8-bit data bus width (hereinafter, referred to as an '×8 memory device') may transmit and receive data to and from the memory controller 310 through eight I/O pins.

The memory devices 321a to 321z may perform a burst operation of writing or reading a large amount of data, while sequentially increasing or decreasing an initial address received from the memory controller 310. A basic unit of the burst operation may be referred to as a 'burst length'. The burst length may refer to the number of pieces of data input to or output from each of the memory devices 321a to 321z, during a burst operation. For example, when the burst length is 4, 4-bit data may be written to or read from each of the memory devices 321a to 321z, during a burst operation.

A value obtained by multiplying the number of pieces of data input to or output from each of the memory devices 321a to 321z through the I/O pins during the burst operation by the data bus width may indicate the size (i.e., a bit size) of data input to or output from each of the memory devices 321a to 321z by the burst operation. As discussed above, the number of pieces of data input to or output from each of the memory devices 321a to 321z by a burst operation may be referred to as a 'burst length' and thus burst length is an indication of the size (i.e., a bit size) of data input to or output from each of the memory devices 321a to 321z by the burst operation. For example, when 2-bit data is input/output through each I/O pin during the burst operation and the data bus width of each of the memory devices 321a to 321z is 4 bits, the size of data input to or output from each of the memory devices 321a to 321z by the burst operation, and thus the burst length, may be 8 bits. On the other hand, when 1-bit data is input/output through each I/O pin during the burst operation and the data bus width of each of the memory devices 321a to 321z is 4 bits, the size of data input to or output from each of the memory devices 321a to 321z by the burst operation, and thus the burst length, may be 4 bits.

A value obtained by multiplying the burst length by the number of data chips may indicate the number of pieces of data input to or output from the memory devices 321a to 321z by a burst operation. For example, when the size of data input to or output from each of the memory devices 321a to 321z by the burst operation is 8 and the number of memory devices 321a to 321z is 18, the number of pieces of data input to or output from the memory devices 321a to 321z together by the burst operation may be 144 bits.

The memory controller 310 may exchange various signals and data with the memory module 320 through a bus 330. For example, the memory controller 310 may transmit or receive an address signal ADD, a command signal CMD, a clock signal CLK, a control signal CTL, and a code word CW to and from and the memory module 320 through the bus 330.

The memory controller 310 may communicate with and be coupled to the memory module 320 through a DDR DRAM interface used to perform memory access operations performed via the bus 330. The DDR DRAM interface may be a memory standard interface specification of the Joint Electron Device Engineering Council (JEDEC). The memory module 320 may be connected to the memory controller 310 according to the DDR DRAM interface, but embodiments are not limited thereto. The memory module 320 may be connected to the host 200 through various types of communication interfaces other than the DDR DRAM interface. For example, communication interfaces may include an Industry Standard Architecture (ISA) interface, a PCIe interface, a SATA interface, a SCSI interface, a SAS interface, a UAS interface, an Internet Small Computer System Interface (iSCSI) interface, Fiber Channel, a Fiber Channel over Ethernet (FCoE) interface, and the like.

According to an embodiment, the ECC engine 316 may determine the type of the code word group CWG according to the sizes of the data words WD and RD, and perform an error detection and error correction differently depending on the type of the code word group CWG. Accordingly, the memory system 300 having improved reliability may be provided.

In addition, according to an embodiment, the ECC engine 316 may include a type determination flag for determining the size of the data words WD and RD in the code word group CWG, thereby not requiring an additional storage space to store the type determination flag. Accordingly, the memory system 300 having improved reliability, even without requiring an additional storage space, may be provided.

Hereinafter, the code word group CWG and the ECC engine 316 performing an error detection and error correction operation differently depending on the type of the code word group CWG are described in more detail.

Figure 2:
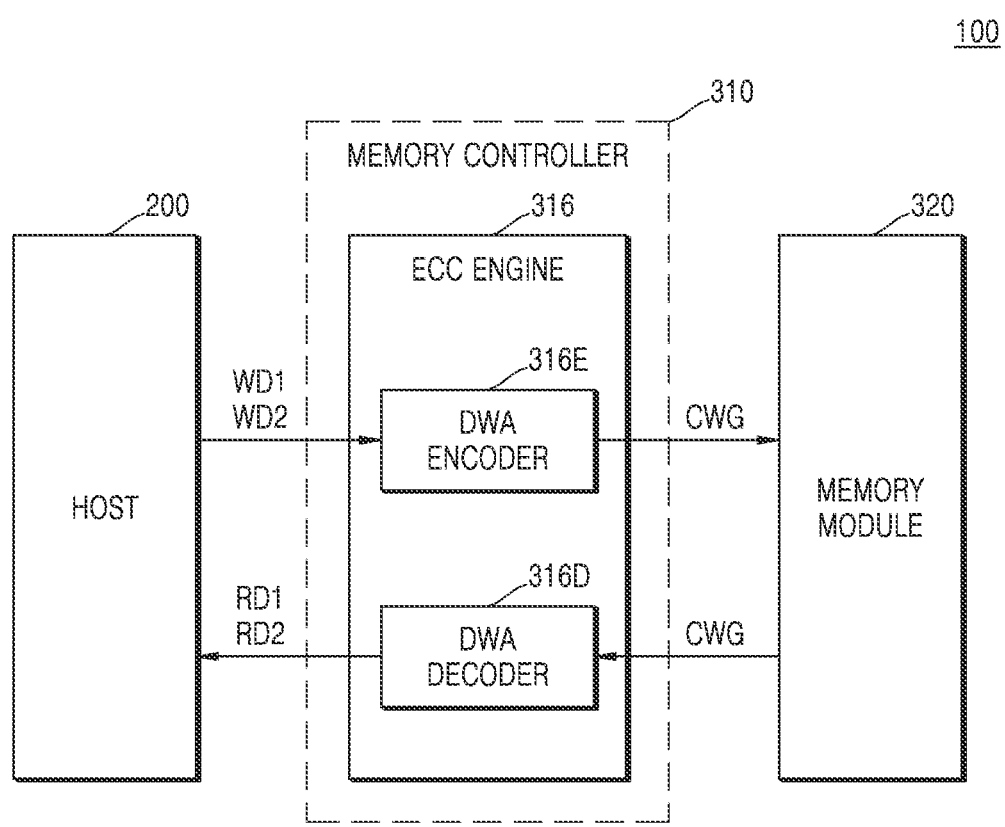
FIG. 2 is a block diagram illustrating an error correction code (ECC) engine according to an embodiment.

FIG. 2 is a block diagram illustrating the ECC engine 316 according to an embodiment, and FIG. 3 is a diagram illustrating a code word group provided by the ECC engine 316 according to an embodiment. In detail, FIG. 2 is a view illustrating an embodiment of the ECC engine 316 of FIG. 1, and FIG. 3 is a view illustrating a code word group CWG provided by the ECC engine 316 of FIG. 1. Hereinafter, descriptions are given with reference to FIG. 1, and corresponding components are denoted by the same reference numerals.

Referring to FIG. 2, the ECC engine 316 may include a DWA encoder 316E and a DWA decoder 316D. The DWA encoder 316E and the DWA decoder 316D may perform an error detection and error correction operation using a parity-check, a CRC check, a checksum check, and a Hamming code. Hereinafter, it is described that the DWA encoder 316E and the DWA decoder 316D perform an error detection and error correction operation using a Hamming code, but embodiments are not limited thereto.

The DWA encoder 316E may receive a first data word (DW1 in FIG. 3) and a second data word (DW2 in FIG. 3), respectively, as first write data WD1 and second write data WD2, from the host 200. The DWA encoder 316E may determine whether the size of each of the first data word DW1 and the second data word DW2 is less than or equal to a reference bit value (i.e., a reference size). The reference bit value may be a preset value. For example, when each of the first data word DW1 and the second data word DW2 has a maximum of 64 bits, the reference bit value may be 32 bits. However, embodiments are not limited thereto, and in another embodiment, the reference bit value may be, for example, 50 bits. Hereinafter, a data word equal to or less than the reference bit value may be referred to as a 'narrow-width data word', and a data word larger than the reference bit value may be referred to as 'full-width data word'.

The DWA encoder 316E may generate a code word group CWG based on sizes of the first data word (DW1 in FIG. 3) and the second data word (DW2 in FIG. 3) received as the first write data WD1 and the second write data WD2. The code word group CWG may correspond to any one of a first type, a second type, a third type and a fourth type (CWG1 to CWG4 in FIG. 3) according to the sizes of the first data word (DW1 in FIG. 3) and the second data word (DW2 in FIG. 3). The DWA encoder 316E may perform an error detection and error correction operation in any one of the first to third modes, according to one of the first to fourth types (CWG1 to CWG4 in FIG. 3) of the code word group CWG.

Referring to FIG. 3, each of the first to fourth type code word groups CWG1 to CWG4 may include the first data word DW1, the second data word DW2, parity bits P1 for the first data word, parity bits P2 for the second data word, and a type determination flag TDF. The DWA encoder 316E may generate code word groups CWG1 to CWG4 of various sizes. For example, the size of the first type code word group CWG1 and the size of the fourth type code word group CWG4 generated by the DWA encoder 316E may be the same as or different from each other. In FIG. 3 and the following drawings, it is described that each of the first data word DW1 and the second data word DW2 may have a maximum size of 64 bits, and each of the first to fourth type code word groups CWG1 to CWG4 may have a maximum size of 144 bits, but embodiments are not limited thereto.

The type determination flag TDF may include a flag F and a flag N. The flag F may indicate whether both the first data word DW1 and the second data word DW2 are full-width data words. For example, when the flag F is '1', both the first data word DW1 and the second data word DW2 may be full-width data words, and when the flag F is '0', at least one of the first data word DW1 and the second data word DW2 may be a narrow-width data word. However, embodiments are not limited thereto, and the flag F may be set in various manners. For example, in some embodiments, the flag F of '0' may be set to indicate that both the first data word DW1 and the second data word DW2 are full-width data words, and the flag F of '1' may be set to indicate that at least one of the first data word DW1 and the second data word DW2 may be a narrow-width data word.

When at least one of the first data word DW1 and the second data word DW2 is a narrow-width data word, the flag N may indicate which one of the first data word DW1 and the second data word DW2 is a narrow-width data word. For example, the flag N of '00' may indicate that both the first data word DW1 and the second data word DW2 are narrow-width data words, and the flag N of '11' may indicate that only the first data word DW1 is a narrow-width data word, and the flag N of '10' may indicate that only the second data word DW2 is a narrow-width data word. However, embodiments are not limited thereto, and the flag N may be set in various manners.

Both the first data word DW1 and the second data word DW2 included in the first type code word group CWG1 may be narrow-width data words. That is, the sizes of the first data word DW1 and the second data word DW2 included in the first type code word group CWG1 may be equal to or less than the reference bit value. The sizes of the first data word DW1 and the second data word DW2 may be the same as or different from each other.

Accordingly, the type determination flag TDF included in the first type code word group CWG1 may include a flag F indicating that both the first data word DW1 and the second data word DW2 are narrow-width data words and a flag N indicating that both the first data word DW1 and the second data word DW2 are narrow-width data words. For example, the type determination flag TDF included in the first type code word group CWG1 may include a flag F of '0' and a flag N of '00'.

Each of the parity bits P1 for the first data word and the parity bits P2 for the second data word constituting the first type code word group CWG1 may have a size of at least 16 bits. The parity bits P1 for the first data word and the parity bits P2 for the second data word included in the first type code word group CWG1 may be stored in more than 16 bits using a residual area RA. Because an error correction effect may increase as the ratio of the size of the parity bit to the size of the data word increases, the error correction effect for the first type code word group CWG1 may increase as the size of the parity bits P1 for the first data word and the size of the parity bits P2 for the second data word stored using the residual area RA increase.

The first data word DW1 included in the second type code word group CWG2 may be a narrow-width data word, and the second data word DW2 may be a full-width data word. That is, the size of the first data word DW1 included in the second type code word group CWG2 may be equal to or less than the reference bit value, and the size of the second data word DW2 may be greater than the reference bit value.

Accordingly, the type determination flag TDF constituting the second type code word group CWG2 may include a flag F indicating that a narrow-width data word is included and a flag N indicating that the first data word DW1 is a narrow-width data word. For example, the type determination flag TDF included in the second type code word group CWG2 may include a flag F of '0' and a flag N of '11'.

The parity bits P1 for the first data word included in the second type code word group CWG2 may have a size of at least 16 bits, and the parity bits P2 of the second data word may have a size of at least 8 bits. Because the error correction effect may increase as the ratio of the size of the parity bits to the size of the data word increases, the error correction effect for the first data word DW1 may be higher than the error correction effect for the second data word DW2.

The first data word DW1 included in the third type code word group CWG3 may be a full-width data word, and the second data word DW2 may be a narrow-width data word. That is, the size of the first data word DW1 included in the third type code word group CWG3 may be greater than the reference bit value, and the size of the second data word DW2 may be equal to or less than the reference bit value.

Accordingly, the type determination flag TDF constituting the third type code word group CWG3 may include the flag F indicating that the narrow-width data word is included and the flag N indicating that the second data word DW2 is a narrow-width data word. For example, the type determination flag TDF included in the third type code word group CWG3 may include a flag F of '0' and a flag N of '10'.

The parity bits P1 for the first data word constituting the third type code word group CWG3 may have a size of at least 8 bits, and the parity bits P2 for the second data word may have a size of at least 16 bits. Because the error correction effect may increase as the ratio of the size of the parity bits to the size of the data word increases, the error correction effect for the second data word DW2 may be higher than the error correction effect for the first data word DW1.

Both the first data word DW1 and the second data word DW2 included in the fourth type code word group CWG4 may be full-width data words. That is, the sizes of the first data word DW1 and the second data word DW2 included in the fourth type code word group CWG4 may be greater than the reference bit value. The sizes of the first data word DW1 and the second data word DW2 may be the same as or different from each other.

Accordingly, the type determination flag TDF constituting the fourth type code word group CWG4 may include a flag F indicating that both the first data word DW1 and the second data word DW2 are full-width data words, and flag N may be omitted. For example, the type determination flag TDF constituting the fourth type code word group CWG4 may include a flag F of '1'.

The fourth type of code word group CWG4 may include parity bits P3 for both the first data word and the second data word. The parity bits P3 for both the first data word and the second data word may have a size of at least 8 bits. That is, parity bits of at least 8 bits for a data word having a maximum size of 128 bits may be included. It is noted that FIG. 3 illustrates a box labeled "DW1 DW2" for bits 64 to 71 on the bottom. This space may be used for additional bits for the first data word DW1 and/or the second data word DW2 depending on the sizes of the first data word DW1 and the second data word DW2.

Referring back to FIG. 2, the DWA encoder 316E may select an error correction mode according to the type of the code word group CWG, and may perform an error detection and error correction operation on the code word group CWG, based on the selected error correction mode. The error correction mode may include a first mode, a second mode, and a third mode. The DWA encoder 316E may perform an error correction and error detection operation on the first type code word group CWG1 in the first mode, may perform an error correction and error detection operation on the second and third type code word groups CWG2 and CWG3 in the second mode, and may perform an error correction and error detection operation on the fourth type code word group CWG4 in the third mode.

In the first mode, the DWA encoder 316E may perform an error correction and error detection operation by detecting at least 4 bits and correcting at least 3 bits for each of the first data word DW1 and the second data word DW2 included in the first type code word group CWG1.

In the second mode, the DWA encoder 316E may perform an error correction and error detection operation by detecting at least 4 bits and correcting at least 3 bits for a narrow-width data word, among the first data word DW1 and the second data word DW2 included in the second type and third type code word groups CWG2 and CWG3, and detecting 2 bits and correcting one bit for a full-width data word.

For example, the DWA encoder 316E may perform an error correction and error detection operation by detecting at least 4 bits and correcting at least 3 bits for the first data word DW1 included in the second type code word group CWG2, and may perform an error correction and error detection operation by detecting 2 bits and correcting one bit for the second data word DW2.

In the third mode, the DWA encoder 316E may perform an error correction and error detection operation by detecting 2 bits and correcting one bit for both the first data word DW1 and the second data word DW2 included in the fourth type code word group CWG4. Because the error correction effect is higher as the ratio of the size of the parity bits to the size of the data word increases, the first mode may have an error correction effect higher than those of the second mode and the third mode, and the second mode may have an error correction effect higher than that of the third mode.

The DWA encoder 316E may transmit the code word group CWG, on which error detection and error correction have been completed, to the memory module 320. The memory module 320 may store the code word group CWG.

The DWA decoder 316D may receive the code word group CWG from the memory module 320. The DWA decoder 316D may perform error correction decoding on the code word group CWG to detect and correct an error of the code word group CWG, and extract a first data word DW1 and a second data word DW2 respectively output as first read data RD1 and second read data RD2.

The DWA decoder 316D may determine to which of the first to fourth types (CWG1 to CWG4 in FIG. 3) the code word group CWG corresponds, based on the type determination flag TDF included in the code word group CWG. The DWA decoder 316D may select an error correction mode according to which of the first to fourth types (CWG1 to CWG4 in FIG. 4) the code word group CWG corresponds.

For example, the DWA decoder 316D may perform an error detection and error correction operation in any one of the first to third modes.

For example, the DWA decoder 316D may perform an error detection and error correction operation on the first type code word group CWG1 in the first mode, may perform an error detection and error correction operation on the second type and third type code word groups CWG2 and CWG3 in the second mode, and may perform an error detection and error correction operation on the fourth type code word group CSG4 in the third mode.

The DWA decoder 316D may transmit the first data word DW1 and the second data word DW2 extracted from the code word group CWG4, as the first read data RD1 and the second read data RD2, to the host 200. Hereinafter, an error correction encoding method of the DWA encoder 316E is described in more detail with reference to FIGS. 4 and 5.

Figure 4:
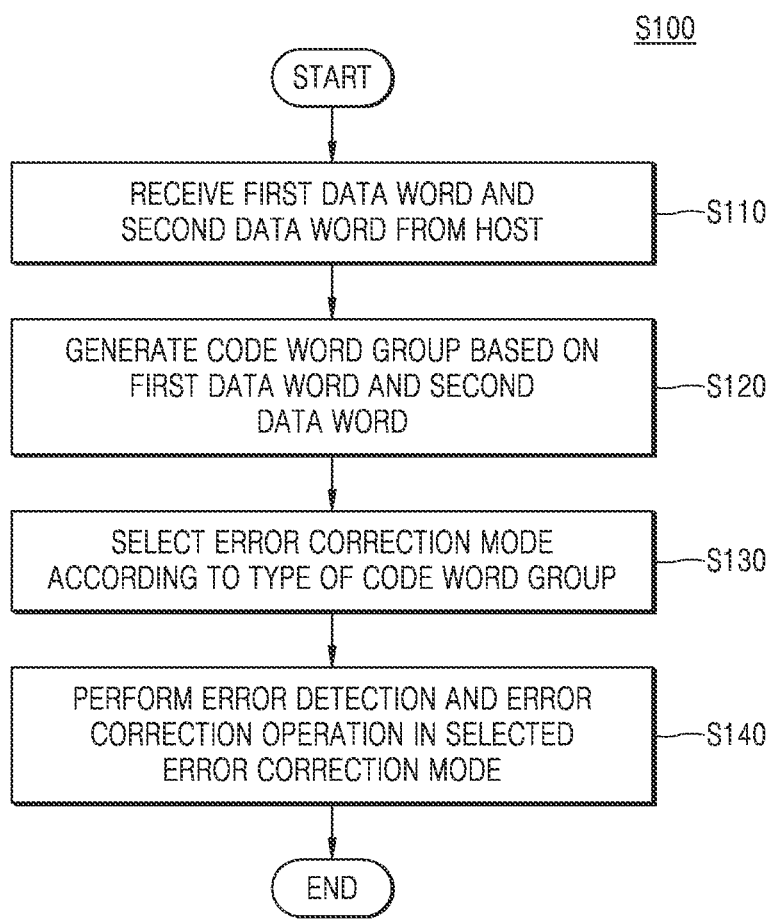
FIG. 4 is a flowchart illustrating an error correction encoding method of a data-width aware (DWA) encoder, according to an embodiment.

FIG. 4 is a flowchart illustrating an error correction encoding method S100 of a DWA encoder, according to an embodiment. In detail, FIG. 4 is a diagram illustrating an embodiment of an operation of the DWA encoder 316E of FIG. 2. Hereinafter, descriptions are given with reference to FIGS. 1 to 3, and corresponding components are denoted by the same reference numerals.

Referring to FIG. 4, the error correction encoding method S100 of the DWA encoder (316E in FIG. 2) may include operations S10, S120, S130, and S140. Hereinafter, the error correction encoding method S100 of the DWA encoder (316E in FIG. 2) is described, but error correction decoding may be performed by using the error correction encoding method S100 in the DWA decoder (316D in FIG. 2), as apparent to those skilled in the art.

In operation S110, the DWA encoder (316E in FIG. 2) may receive a first data word (DW1 of FIG. 3) and a second data word (DW2 of FIG. 3) from the host (200 of FIG. 2). The first data word and the second data word may be respectively input, as first write data (WD1 in FIG. 2) and second write data (WD2 in FIG. 2), to the DWA encoder (316E in FIG. 2).

In operation S120, the DWA encoder (316E in FIG. 2) may generate a code word group (the CWG in FIG. 2) based on the first data word (DW1 in FIG. 3) and the second data word (DW2 in FIG. 3). As described above with reference to FIG. 3, the code word group (the CWG in FIG. 2) may include the first and second data words (DW1 and DW2 in FIG. 3), the parity bits (P1 and P2 of FIG. 3) for the first and second data words, and the type determination flag (the TDF of FIG. 3) indicating the sizes of the first and second data words.

The DWA encoder (316E in FIG. 2) may generate the type determination flag (the TDF in FIG. 3) included in the code word group based on the sizes of the first data word (DW1 in FIG. 3) and the second data word (DW2 in FIG. 3). The DWA encoder (316E in FIG. 2) may generate the type determination flag (the TDF in FIG. 3) based on a result of comparing the size of each of the first data word (DW1 in FIG. 3) and the second data word (DW2 in FIG. 3) to the reference bit value (i.e., a reference size). The type determination flag (the TDF in FIG. 3) may include a flag F indicating whether both the first and second data words are full-width data words and a flag N indicating which of the first and second data words is a narrow-width data word. As discussed above, the flag N may be omitted when both the first and second data words are full-width data words.

The DWA encoder (316E in FIG. 2) may determine a type of the code word group (the CWG of FIG. 2) based on the type determination flag (the TDF of FIG. 3). The code word group may be determined to be any one of the first to fourth types (CWG1 to CWG4 in FIG. 3).

In operation S130, the DWA encoder (316E in FIG. 2) may select an error correction mode according to the type of code word group. The error correction mode may include first to third modes. For example, the DWA encoder (316E in FIG. 2) may select the error correction mode as the first mode when the code word group is the first type, select the error correction mode as the second mode when the code word group is the second type or the third type, and select the error correction mode as the third mode when the code word group is of the fourth type.

The first mode may be an error correction mode in which at least 4 bits are detected and at least 3 bits are corrected for each of the first and second data words. The second mode may be an error correction mode in which at least 4 bits are detected and at least 3 bits are corrected for a narrow-width data word, among the first and second data words, and 2 bits are detected and 1 bit is corrected for a full-width data word. The third mode may be an error correction mode in which 2 bits are detected and 1 bit is corrected for both the first and second data words.

In operation S140, the DWA encoder (316E in FIG. 2) may perform an error detection and error correction operation on the code word group in the selected error correction mode. The code word group on which the error detection and error correction operation has been completed may be transmitted to the memory module 320 of FIG. 2.

Figure 5:
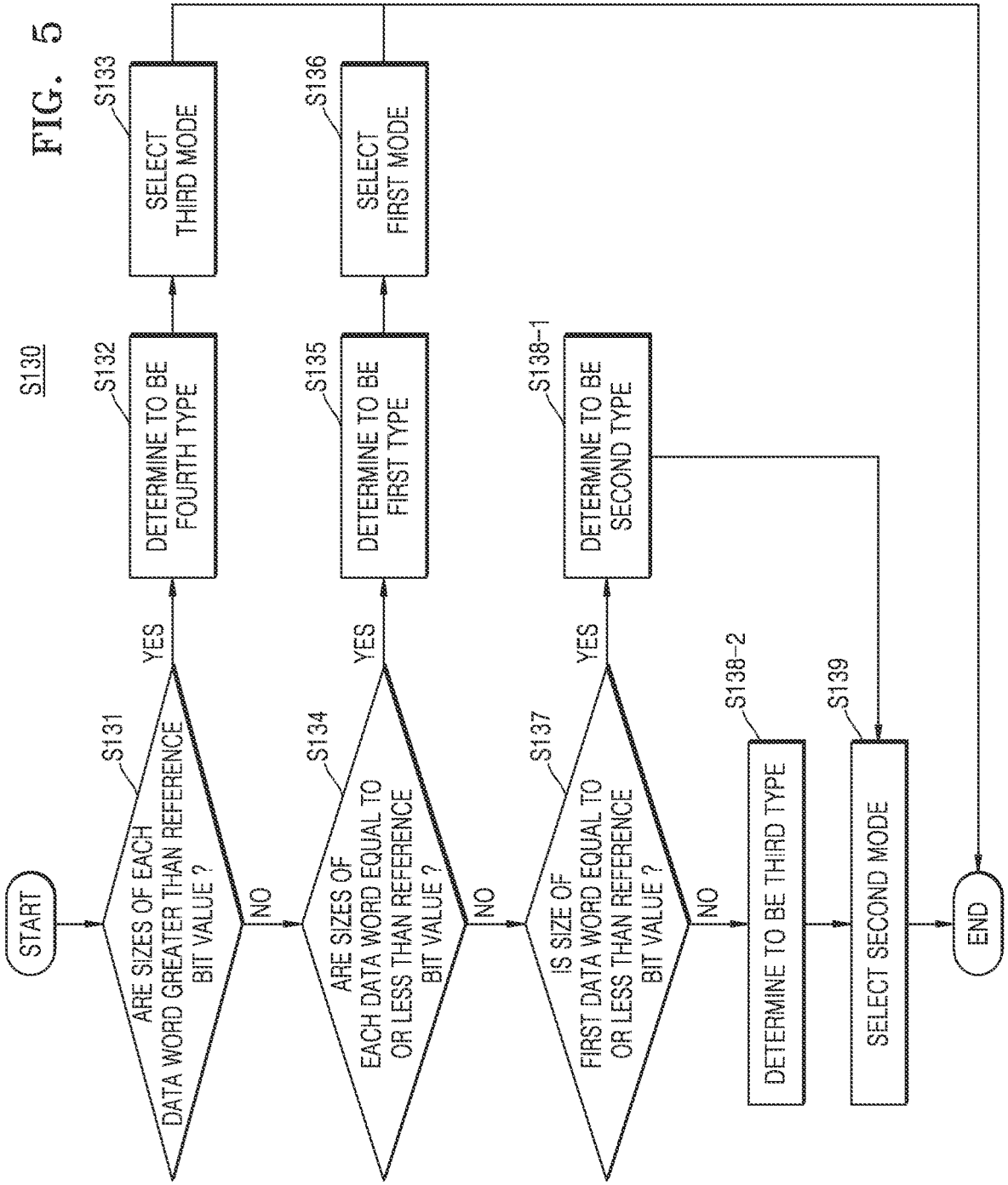
FIG. 5 is a diagram illustrating an embodiment of selecting an error correction mode in the error correction encoding method of FIG. 4.

FIG. 5 is a diagram illustrating an embodiment of operation S130 of FIG. 4. Hereinafter, descriptions are given with reference to FIGS. 1 to 4, and corresponding components are denoted by the same reference numerals.

Referring to FIG. 5, operation S130 may include operations S131, S132, S133, S134, S135, S136, S137, S138-1, S138-2, and S139.

In operation S131, the DWA encoder (316E in FIG. 2) may determine whether the sizes of the first and second data words are each greater than the reference bit value (i.e., a reference size). The reference bit value may be a preset value. The reference bit value may be a value previously determined by a user. For example, when a maximum size of each data word is 64 bits, the reference bit value may be set to 32 bits.

In operation S132, when the sizes of the first and second data words are greater than the reference bit value (S131, YES), the DWA encoder (316E in FIG. 2) may determine the type of the code word group including the first and second data words to be the fourth type.

In operation S133, the DWA encoder (316E in FIG. 2) may select an error correction mode for the fourth type code word group as the third mode.

In operation S134, the DWA encoder (316E in FIG. 2) may determine whether the sizes of the first and second data words are each equal to or less than the reference bit value. In this case, the sizes of the first and second data words may be the same as or different from each other.

In operation S135, when the sizes of the first and second data words are each equal to or less than the reference bit value (S134, YES), the DWA encoder (316E in FIG. 2) may determine the type of the code word group including the first and second data words, to be the first type.

In operation S136, the DWA encoder (316E in FIG. 2) may select an error correction mode for the first type code word group as the first mode.

In operation S137, the DWA encoder (316E in FIG. 2) may determine whether the size of the first data word is equal to or less than the reference bit value.

In operation S138-1, when the size of the first data word is equal to or less than the reference bit value (S137, YES), the DWA encoder (316E in FIG. 2) may determine the type of the code word group including the first and second data words to be the second type, and the method may proceed to operation S139.

In operation S138-2, when the size of the first data word is not equal to or less than the reference bit value (S137, NO), the DWA encoder (316E in FIG. 2) may determine the type of the code word group including the first and second data words to be the third type.

In operation S139, the DWA encoder (316E in FIG. 2) may select an error correction mode for the second type and third type code word groups as the second mode.

FIG. 6 is a diagram illustrating a type determination flag according to an embodiment. In detail, FIG. 6 is a diagram illustrating an embodiment of a type determination flag included in the code word group of FIG. 3. Hereinafter, descriptions are given with reference to FIGS. 1 to 3, and corresponding components are denoted by the same reference numerals.

Referring to FIG. 6, a type determination flag TDF included in a code word group may include a flag F and a flag N. However, in some situations the flag N may be omitted as discussed below. The flag F may be a flag indicating whether the first data word and the second data word constituting the code word group are all full-width data words. The flag N may be a flag indicating which data word is a narrow-width data word when at least one of the first data word and the second data word constituting the code word group is a narrow-width data word.

The type determination flag TDF may include a plurality of bits. Each of the flag F and the flag N may include a plurality of bits. The sizes of the flag F and the flag N may be the same as or different from each other. For example, the size (i.e., number of bits) of the flag F may be 7 bits, and the size (i.e., number of bits) of the flag N may be 14 bits. However, embodiments are not limited thereto.

When the size of the flag F is 7 bits and the size of the flag N is 14 bits, the type determination flag TDF included in the first type code word group CWG1 may include a flag F of '0000000' and a flag N of '00000000000000'.

When the size of the flag F is 7 bits and the size of the flag N is 14 bits, the type determination flag TDF included in the second type code word group CWG2 may include a flag F of '0000000' and a flag N of '11111111111111'.

When the size of the flag F is 7 bits and the size of the flag N is 14 bits, the type determination flags TDF included in the third type code word group CWG3 may include a flag F of '0000000' and a flag N of '11111110000000'.

When the size of the flag F is 7 bits and the size of the flag N is 14 bits, the type determination flag TDF included in the fourth type code word group CWG4 may include a flag F of '1111111', and flag N may be omitted.

According to an embodiment, because the type determination flag TDF includes the flag F and the flag N having a plurality of bits, the type of the code word group may be determined accurately even if an error occurs in the type determination flag TDF. Hereinafter, a method of accurately determining the type of the code word group by the DWA decoder 316D using the type determination flag TDF including the flag F and the flag N having a plurality of bits even if an error occurs in the type determination flag TDF is described with reference to FIG. 7.

Figure 7:
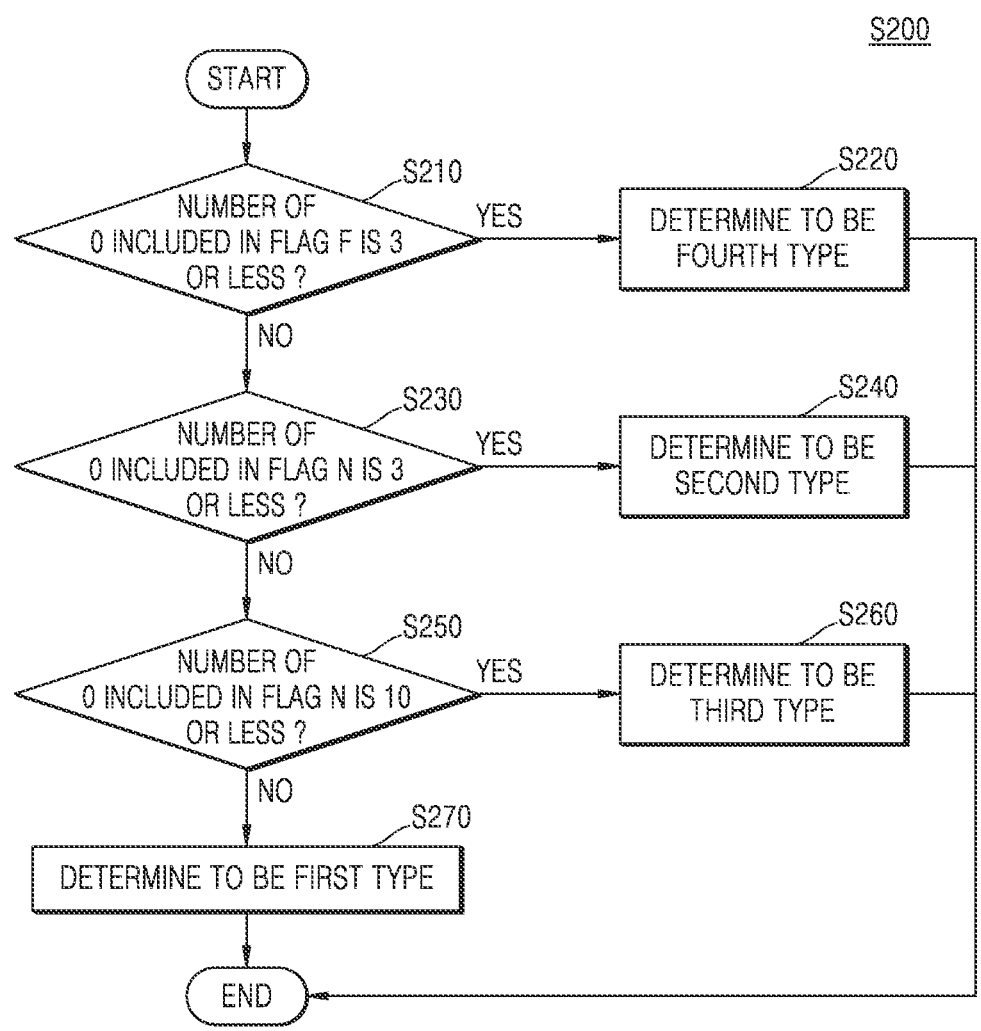
FIG. 7 is a flowchart illustrating a method of determining a type of a code word group according to a DWA decoder, according to an embodiment.

FIG. 7 is a flowchart illustrating a method of determining a type of a code word group by a DWA decoder, according to an embodiment. In detail, FIG. 7 is a diagram illustrating an embodiment of a method S200 for the DWA decoder (316D of FIG. 2) to determine a type of a code word group using the type determination flag of FIG. 6. Hereinafter, descriptions are given with reference to FIGS. 1 to 6, and corresponding components are denoted by the same reference numerals.

Referring to FIG. 7, the method S200 of determining a type of a code word group by the DWA decoder (316D of FIG. 2) may include operations S210, S220, S230, S240, S250, S260, and S270. Hereinafter, the method S200 of determining a type of a code word group by the DWA decoder (316D in FIG. 2) is described, but it is apparent to those skilled in the art that error correction encoding may be performed using the method S200 of determining a type of a code word group.

In operation S210, the DWA decoder (316D of FIG. 2) may determine whether a number of '0's included in the flag F included in the code word group (CWG of FIG. 2) is three or less.

In operation S220, when the number of '0's included in the flag F constituting the code word group is three or less (S210, YES), the DWA decoder (316D in FIG. 2) may determine the code word group to be the fourth type. Accordingly, the DWA decoder (316D of FIG. 2) may perform an error detection and error correction operation for the code word group in the third mode.

In operation S230, when the number of '0's included in the flag F constituting the code word group is more than three (S210, NO), the DWA decoder (316D in FIG. 2) may determine whether a number of '0's included in the flag N included in the code word group is three or less.

In operation S240, when the number of '0's included in the flag N included in the code word group is three or less (S230, YES), the DWA decoder (316D in FIG. 2) may determine the code word group to be the second type. Accordingly, the DWA decoder (316D of FIG. 2) may perform an error detection and error correction operation for the code word group in the second mode.

In operation S250, when the number of '0's included in the flag N included in the code word group is more than three (S230, NO), the DWA decoder (316D in FIG. 2) may determine whether the number of '0's included in the flag N constituting the code word group is 10 or less.

In operation S260, when the number of '0's included in the flag N included in the code word group is 10 or less (S250, YES), the DWA decoder (316D in FIG. 2) may determine the code word group to be the third type. Accordingly, the DWA decoder (316D of FIG. 2) may perform an error detection and error correction operation for the code word group in the second mode.

In operation S270, when the number of '0's included in the flag N constituting the code word group is greater than 10 (S250, NO), the DWA decoder (316D in FIG. 2) may determine the code word group to be the first type. Accordingly, the DWA decoder (316D of FIG. 2) may perform an error detection and error correction operation for the code word group in the first mode.

According to an embodiment, the DWA decoder (316D of FIG. 2) may determine the type of the code word group by counting the number of '0's included in the flag F and the flag N included in the type determination flag TDF. Because the DWA decoder (316D in FIG. 2) may detect an error of at least 4 bits and correct an error of at least 3 bits even for the type determination flag TDF, even if an error occurs in the type determination flag TDF, the DWA decoder (316D in FIG. 2) may accurately determine the type of the code word group. Accordingly, the memory system (300 of FIG. 1) having improved reliability may be provided.

Figure 8:
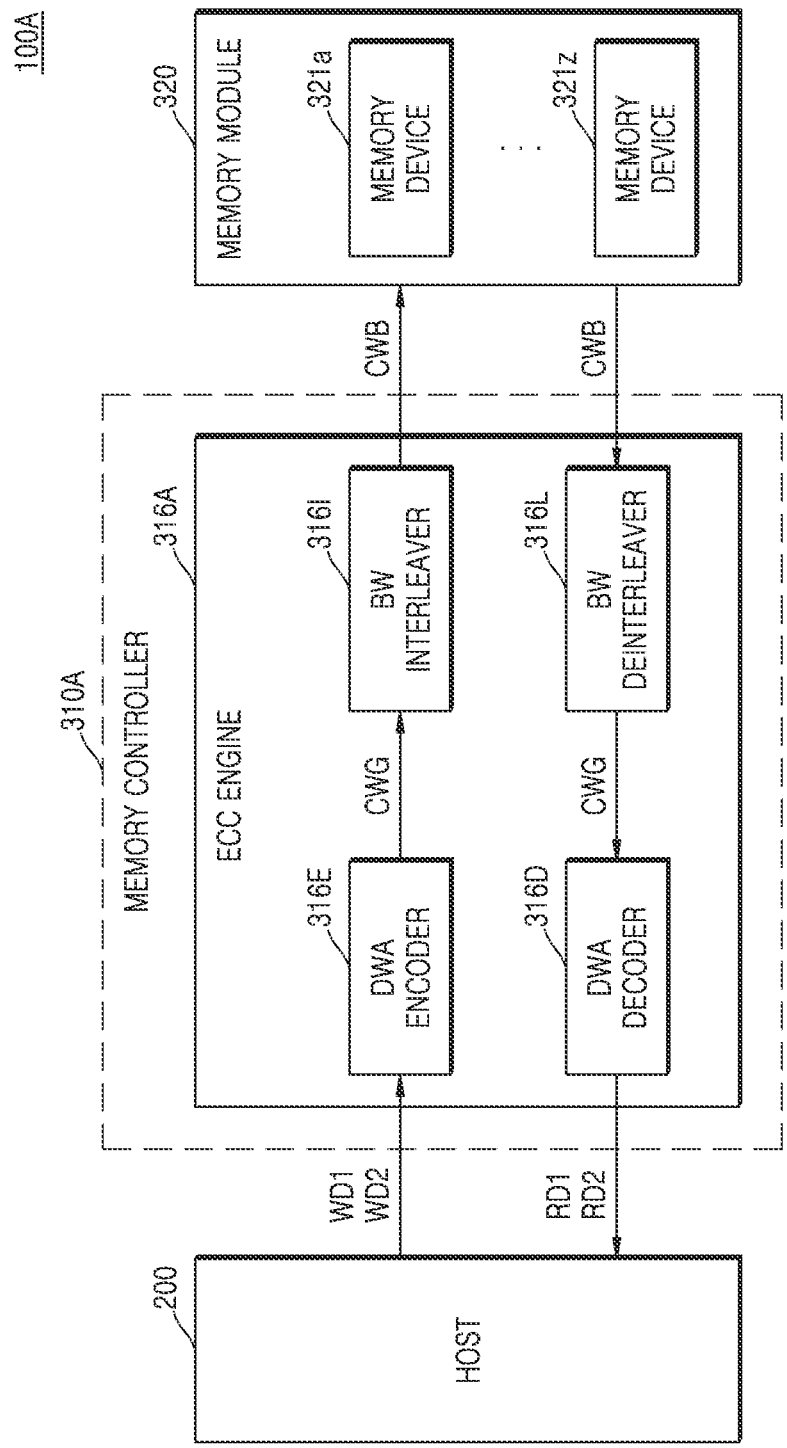
FIG. 8 is a block diagram illustrating a computing system according to an embodiment.

FIG. 8 is a block diagram illustrating a computing system 100A according to an embodiment. In detail, FIG. 8 is a view illustrating another embodiment of the ECC engine 316 of FIG. 2. Hereinafter, descriptions are given with reference to FIGS. 1 to 7, and corresponding components are denoted by the same reference numerals, and redundant descriptions are omitted for conciseness.

Referring to FIG. 8, the computing system 100A may include the host 200, a memory controller 310A, and the memory module 320, and the memory controller 310A may include the ECC engine 316A. The memory controller 310A may include the DWA encoder 316E and the DWA decoder 316D, and unlike the memory controller (310 in FIG. 2), the memory controller 310A may further include a bitwise (BW) interleaver 316I and a BW deinterleaver 316L.

The BW interleaver 316I may receive a code word group CWG generated by the DWA encoder 316E from the DWA encoder 316E. The BW interleaver 316I may sequentially transmit bits CWB included in the code word group to the memory devices 321a to 321z included in the memory module 320.

For example, when the size of the code word group CWG is 144 bits and the number of memory devices 321a to 321z included in the memory module 320 is 18, the BW interleaver 316I may sequentially transmit 0th to $17^{th}$ consecutive bits, among the bits CWB included in the code word group, one by one to the memory devices 321a to 321z, and may sequentially transmit $18^{th}$ to $35^{th}$ consecutive bits, among the bits CWB included in the code word group, one by one to the memory devices 321a to 321z. The BW interleaver 316I may transmit up to a 143th bit to the memory device 321z in this manner.

The BW deinterleaver 316L may receive the bits CWB of the code word group from the memory devices 321a to 321z. The BW deinterleaver 316L may generate the code word group CWG by recombining the bits CWB of the code word group sequentially stored in the memory devices 321a to 321z. The BW deinterleaver 316L may transmit the code word group CWG to the DWA decoder 316D.

According to an embodiment, by sequentially storing the bits CWB of the code word group in the memory devices 321a to 321z through the BW deinterleaver 316L, an error that may occur in any one of the memory devices 321a to 321z may be corrected. Accordingly, the reliability of the memory system may be improved. Hereinafter, an operation of the BW interleaver 316I is described with reference to FIG. 9 by taking a case in which the memory devices 321a to 321z are ×4 memory devices, as an example.

Figure 9:
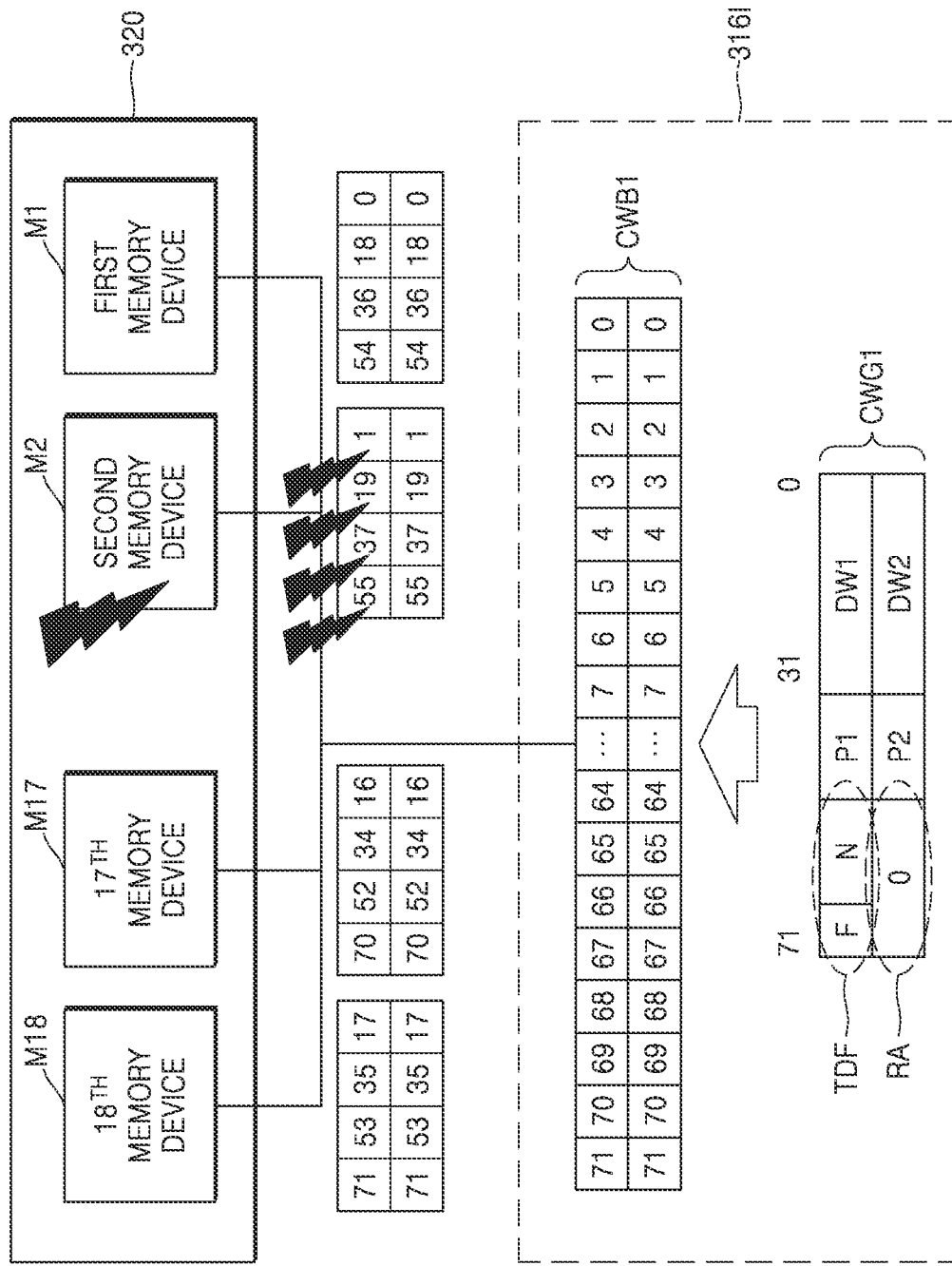
FIG. 9 is a diagram illustrating an operation of a bitwise (BW) interleaver according to an embodiment.

FIG. 9 is a diagram illustrating an operation of a BW interleaver according to an embodiment. In detail, FIG. 9 is a diagram illustrating the operation of the BW interleaver 316I of FIG. 8, in which the first type code word group CWG1 is described. Hereinafter, the descriptions are given with reference to FIGS. 1 to 8, corresponding components are denoted by the same reference numerals, and repeated descriptions are omitted for conciseness.

Referring to FIG. 9, the memory module 320 may include first to eighteenth memory devices M1 to M18. Each of the first to eighteenth memory devices M1 to M18 may be an ×4 memory device, and data of 2 bits per I/O pin may be input/output. Accordingly, a burst length of the first to eighteenth memory devices M1 to M18 may be 8 bits. A value obtained by multiplying the burst length by the number of data chips may represent the number of pieces of data input to or output from the memory module 320 by a burst operation, and thus, the number of pieces of data input to or output from the memory module 320 by the burst operation may be 144 bits.

The BW interleaver 316I may receive the first type code word group CWG1 from the DWA encoder (316E in FIG. 8). The BW interleaver 316I may sequentially transmit the bits CWB1 included in the first type code word group to the memory devices 321a to 321z included in the memory module 320. The BW interleaver 316I may transmit the bits CWB1 included in the first type code word group one by one to the memory devices 321a to 321z, while sequentially increasing addresses of the bits CWB1, so that each of the memory devices 321a to 321z may be controlled to store each of the first data word and the second data word up to 2 bits.

The BW interleaver 316I may sequentially transmit the 0th to 17th consecutive bits one-by-one to the first to 18th memory devices M1 to M18, and may transmit $18^{th}$ to $35^{th}$ consecutive bits one-by-one again to the first to eighteenth memory devices M1 to M18. In this manner, the BW interleaver 316I may transmit up to the 143th bit to the eighteenth memory device M18.

The type determination flag TDF included in the first type code word group CWG1 may include a 7-bit flag F and a 14-bit flag N, and first data word DW1 and second data word DW2 may each have a size of 32 bits. In this case, the first memory device M1 may store a 2-bit first data word DW1, a 2-bit second data word DW2, a parity bit P1 for a 1-bit first data word, a parity bit P2 for a 1-bit second data word, a 1-bit flag N, and a 1-bit residual area RA by the BW interleaver 316I. In this manner, the second memory device M2 may store the data word by 4 bits, store the parity bit for the data word by 2 bits, store the flag N by 1 bit, and store the residual area RA by 1 bit.

In this case, an error may occur in the second memory device M2 and 8-bit data stored in the second memory device M2 may be damaged. However, because the second memory device M2 stores only one bit of the flag N, even if the DWA decoder (316D in FIG. 8) subsequently performs error correction decoding on the first type code word group CWG1, a type of the code word group may be accurately determined by the method (S200 in FIG. 7) described above with reference to FIG. 7. That is, even when an error occurs in the second memory device M2, the DWA decoder (316D of FIG. 8) may perform an error detection and error correction operation for the first type code word group CWG1 in the first mode.

In addition, because the second memory device M2 stores only 2 bits of the first data word DW1, bits of the first data word DW1 in which an error occurs may all be detected and corrected as the DWA decoder (316D in FIG. 8) performs an error detection and error correction operation in the first mode. Also, because the second memory device M2 stores only 2 bits of the second data word DW2, bits of the second data word DW2 in which an error occurs may all be detected and corrected as the DWA decoder (316D in FIG. 8) performs an error detection and error correction operation in the first mode.

In a similar manner, the second to fourth type code word groups (CWG2 to CWG4 in FIG. 3) may also be written to and read from the memory module 320. That is, the BW interleaver 316I may transmit the bits included in the code word group received from the DWA decoder 316D one-by-one to the memory devices 321a to 321z, while sequentially increasing addresses of the bits, so that each of the memory devices 321a to 321z may be controlled to store each of the first data word and the second data word up to 4 bits.

Because each of the first to eighteenth memory devices M1 to M18 may include a data word (write data or read data) of up to 4 bits, all the errors may be detected and corrected as the ECC engine 316A performs error correction encoding or error correction decoding in the first mode or the second mode. In addition, because each of the first to eighteenth memory devices M1 to M18 may include a type determination flag of up to 2 bits, all errors may be detected and corrected as the ECC engine 316A operates in the method described above with reference to FIG. 7. Accordingly, the reliability of the memory system (300 of FIG. 1) may be improved.

Figure 10:
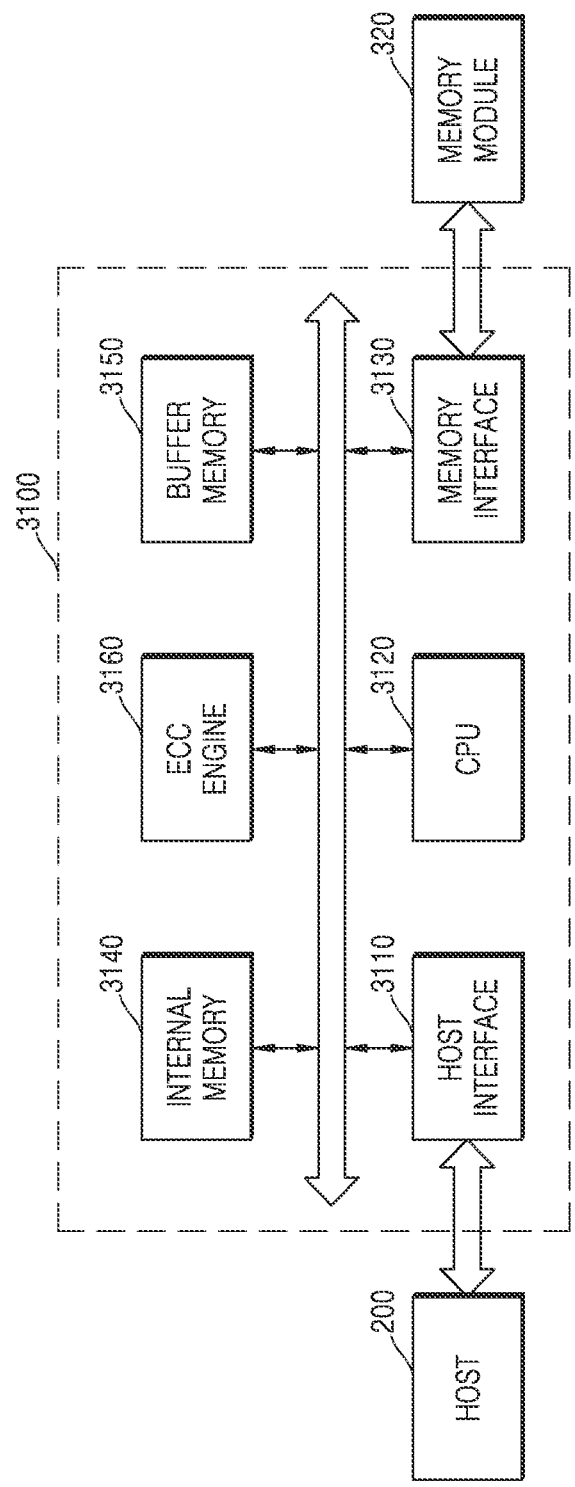
FIG. 10 is a block diagram illustrating a memory controller according to an embodiment.

FIG. 10 is a block diagram illustrating a memory controller according to an embodiment. In detail, FIG. 10 is a block diagram illustrating an embodiment of the memory controller 310 of FIG. 1. Hereinafter, descriptions are given with reference to FIGS. 1 to 8, and repeated descriptions are omitted.

Referring to FIG. 10, a memory controller 3100 may include a host interface 3110, a central processing unit (CPU) 3120, a memory interface 3130, an internal memory 3140, a buffer memory 3150, and an ECC engine 3160. However, embodiments are not limited thereto, and the memory controller 3100 may further include components not shown in FIG. 10.

The host interface 3110 may transmit a request (RQ in FIG. 1) received from the host 200 to the CPU 3120. The host interface 3110 may receive the request (RQ in FIG. 1) from the host 200 under the control of the CPU 3120 and may provide a physical connection between the host 200 and the memory module 320. For example, the host interface 3110 may receive write data corresponding to a write request of the host 200 from the host 200, and store the write data in the buffer memory 3150. For example, the host interface 3110 may respond to a read request from the host 200 and transmit read data stored in the buffer memory 3150 to the host 200.

The host interface 3110 may communicate with the host 200 using various interface protocols. For example, the host interface 3110 may communicate with the host 200 using at least one interface protocols, among non-volatile memory express (NVMe), PCI-e, ATA, SATA, PATA, USB, MMC, ESDI, IDE, mobile industry processor interface (MIPI), universal flash storage (UFS), SCSI, and SAS, but is not limited thereto.

The central processing unit (CPU) 3120 may control the host interface 3110, the memory interface 3130, the internal memory 3140, the ECC engine 3160, and the buffer memory 3150. The CPU 3120 may perform various operations or generate a command (CMD in FIG. 1) and an address (ADD in FIG. 1). For example, the CPU 3120 may generate various commands and addresses necessary for a data write operation and a data read operation according to a request (RQ in FIG. 1) of the host 200 transmitted through the host interface 3110.

When the CPU 3120 receives a write request from the host 200 through the host interface 3110, the CPU 3120 may control the ECC engine 3160 to perform error correction encoding on the write data (WD in FIG. 1) stored in the buffer memory 3150. When the CPU 3120 is notified from the ECC engine 3160 that a code word group (CWG in FIG. 1) based on the write data (WD in FIG. 1) has been generated, the CPU 3120 may generate a write command and a write address. The CPU 3120 may control the memory interface 3130 so that the generated write command and the write address are transmitted to the memory module 320 together with the code word group (CWG in FIG. 1) stored in the buffer memory 3150.

When the CPU 3120 receives a read request from the host 200 through the host interface 3110, the CPU 3120 may generate a read command and a read address. The CPU 3120 may control the memory interface 3130 so that the generated read command and read address are transmitted to the memory module 320. When the CPU 3120 is notified by the memory interface 3130 that the code word group (CWG in FIG. 1) has been received, the CPU 3120 may control the ECC engine 3160 to perform error correction decoding on the code word group (CWG in FIG. 1) stored in the buffer memory 3150. When the CPU 3120 is notified that the read data (RD in FIG. 1) is extracted from the ECC engine 3160, the CPU 3120 may control the host interface 3110 so that the read data (RD in FIG. 1) stored in the buffer memory 3150 is transmitted to the host 200.

The memory interface 3130 may perform communication between the memory controller 3100 and the memory module 320 using various interface protocols. For example, the memory interface 3130 may transmit a write command received from the CPU 3120, a write address, and a code word group stored in the buffer memory 3150 to the memory module 320 during a write operation. For example, the memory interface 3130 may transmit a read command and a read address received from the CPU 3120 to the memory module 320 during a read operation. Also, the memory interface 3130 may store the code word group received from the memory module 320 in the buffer memory 3150 and notify the CPU 3120 that the code word group has been received.

The internal memory 3140 may store various types of information for the operation of the memory controller 3100. For example, the internal memory 3140 may store a plurality of tables. In some embodiments, the internal memory 3140 may be omitted.

The buffer memory 3150 may temporarily store data, while the memory controller 3100 controls the memory module 320. For example, the buffer memory 3150 may store write data (WD in FIG. 1) received from the host interface 3110 and transmit the stored write data to the ECC engine 3160, during a write operation. Also, the buffer memory 3150 may store the code word group (CWG in FIG. 1) received from the ECC engine 3160, and transmit the stored code word group CWG to the memory interface 3130. For example, the buffer memory 3150 may store the code word group (CWG in FIG. 1) received from the memory module 320, and transmit the stored code word group (CWG in FIG. 1) to the ECC engine 3160. Also, the buffer memory 3150 may store read data (RD in FIG. 1) extracted from the code word group received from the ECC engine 3160, and transmit the stored read data to the host interface 3110.

In FIG. 10, the buffer memory 3150 is illustrated to be included in the memory controller 3100, but is not limited thereto. For example, the buffer memory 3150 may be a component disposed outside the memory controller 3100 or a component included in the ECC engine 3160.

The ECC engine 3160 may be a component corresponding to the ECC engines 316 and 316A described above with reference to FIGS. 2 and 8. The ECC engine 3160 may generate a code word group (CWG in FIG. 1) by performing error correction encoding based on the write data (WD in FIG. 1), and store the code word group (CWG in FIG. 1) into the buffer memory 3150. In addition, the ECC engine 3160 may notify the CPU (3120 in FIG. 10) that the code word group (CWG in FIG. 1) has been generated. The code word group CWG may be temporarily stored in the buffer memory 3150 and then transmitted to the memory module 320. However, embodiments are not limited thereto, and when the buffer memory 3150 is omitted, the code word group CWG may be transmitted from the ECC engine 3160 to the memory module 320.

The ECC engine 3160 may extract the read data (RD in FIG. 1) by performing error correction decoding based on the code word group (CWG in FIG. 1), and transmit the read data (RD in FIG. 1) to the buffer memory 3150. Also, the ECC engine 3160 may notify the CPU (3120 in FIG. 10) that the read data (RD in FIG. 1) has been extracted. The read data (RD in FIG. 1) may be temporarily stored in the buffer memory 3150 and then transmitted to the host 200.

According to an embodiment, the ECC engine 3160 may determine the type of the code word group CWG according to a size of the write data (RD in FIG. 1), and may perform an error detection and error correction operation by detecting at least 4-bit error and correcting at least 3-bit error according to the type of the code word group CWG. In addition, the ECC engine 3160 may include a type determination flag for determining the size of the write data (RD in FIG. 1) in the code word group CWG, thereby not requiring an additional storage space for storing the type determination flag. Accordingly, a memory system having improved reliability, without requiring an additional storage space, may be provided.

Figure 11:
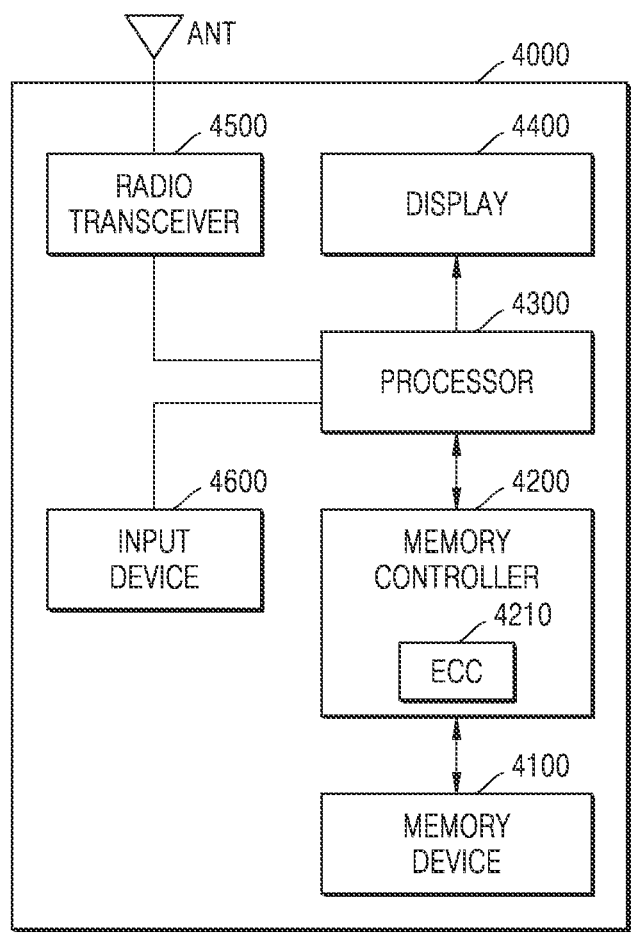
FIG. 11 is a diagram illustrating a memory system according to an embodiment.

FIG. 11 is a diagram illustrating a memory system 4000 according to an embodiment. In detail, FIG. 11 is a diagram illustrating another embodiment of a memory system including the memory controllers 310 and 310A illustrated in FIGS. 2 and 8. Hereinafter, descriptions are given with reference to FIGS. 1 to 9.

Referring to FIG. 11, the memory system 4000 may be implemented as a cellular phone, a smartphone, a tablet, a personal computer (PC), a PDA, or a wireless communication device. The memory system 4000 may include a memory device 4100 and a memory controller 4200 capable of controlling an operation of the memory device 4100. The memory device 4100 may correspond to the memory module 320 of FIG. 2.

The memory controller 4200 may control a data access operation, for example, a write operation or a read operation, of the memory device 4100 under the control of a processor 4300. The memory controller 4200 may correspond to the memory controller 310 of FIG. 2 or the memory controller 310A of FIG. 8. According to an embodiment, the controller 4200 may be implemented as a part of the processor 4300 or may be implemented as a chip separate from the processor 4300.

The memory controller 4200 may include an ECC 4210. The ECC 4210 may correspond to the ECC engine 316 of FIG. 2 or the ECC engine 316A of FIG. 8. Accordingly, the memory system 4000 having improved reliability, without requiring an additional storage space, may be provided.

The processor 4300 may process a signal output from the radio transceiver 4500 and transmit the processed signal to the memory controller 4200 or a display 4400. The processor 4300 may control an operation of the display 4400 so that data output from the memory controller 4200, data output from the radio transceiver 4500, or data output from an input device 4600 may be output through the display 4400. The processor 4300 may correspond to the host 200 of FIG. 2.

The display 4400 may output the data output from the memory controller 4200, the data output from the radio transceiver 4500, or the data output from the input device 4600 under the control of the memory controller 4200.

The radio transceiver 4500 may transmit and receive radio signals through an antenna ANT. For example, the radio transceiver 4500 may change a radio signal received through the antenna ANT into a signal that may be processed by the processor 4300. Also, the radio transceiver 4500 may change a signal output from the processor 4300 into a radio signal and output the changed radio signal to an external device through the antenna ANT.

The input device 4600 may receive a control signal for controlling the operation of the processor 4300 or data to be processed by the processor 4300. For example, the input device 4600 may be implemented as a pointing device such as a touch pad and a computer mouse, a keypad, or a keyboard.

Figure 12:
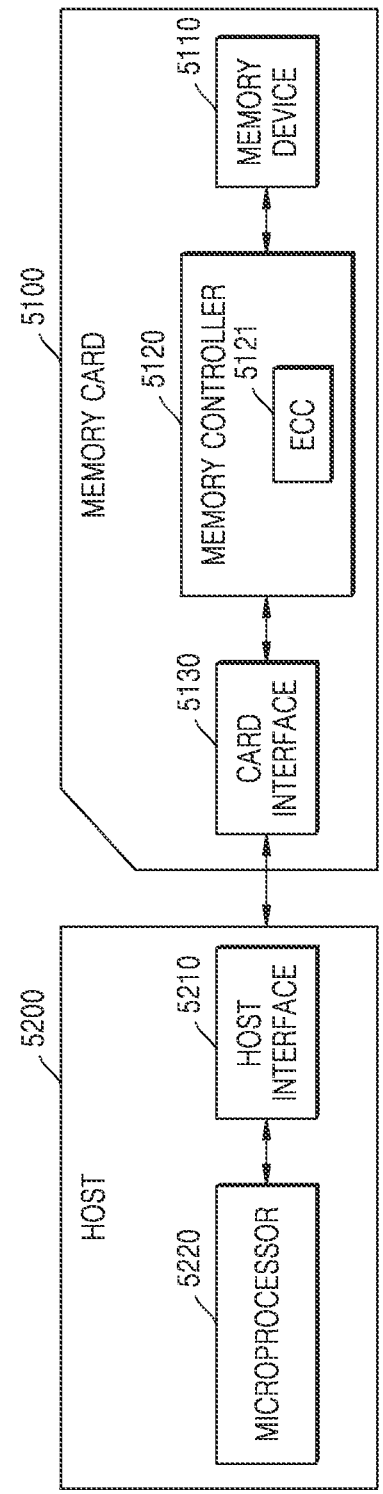
FIG. 12 is a diagram illustrating a memory system according to an embodiment.

FIG. 12 is a diagram illustrating a memory system 5100 according to an embodiment. In detail, FIG. 12 is a diagram illustrating another embodiment of a memory system including the memory controllers 310 and 310A shown in FIGS. 2 and 8.

Referring to FIG. 12, the memory system 5100 may be implemented as a memory card or a smart card. The memory system 5100 may include a memory device 5110, a memory controller 5120, and a card interface 5130.

The memory controller 5120 may control data exchange between the memory device 5110 and the card interface 5130. The memory device 5110 may correspond to the memory module 320 of FIG. 2. The memory controller 5120 may correspond to the memory controller 310 of FIG. 2 or the memory controller 310A of FIG. 8. The memory controller 5120 may include an ECC 5121. The ECC 5121 may correspond to the ECC engine 316 of FIG. 2 or the ECC engine 316A of FIG. 8. Accordingly, the memory system 5100 having improved reliability, without requiring an additional storage space, may be provided.

The card interface 5130 may interface data exchange between a host 5200 and the memory controller 5120 according to a protocol of the host 5200. According to an embodiment, the card interface 5130 may support a USB protocol and an InterChip (IC)-USB protocol. The card interface 5130 may refer to hardware capable of supporting a protocol used by the host 5200, software installed in the hardware, or a signal transmission method. The card interface 5130 may be a secure digital (SD) card interface or an MMC interface, but is not limited thereto.

When the memory system 5100 is connected with a host interface 5210 of the host 5200, such as a PC, tablet, digital camera, digital audio player, mobile phone, console video game hardware, or digital set-top box, the host interface 5210 may perform data communication with the memory device 5110 through the card interface 5130 and the memory controller 5120 under the control of a microprocessor 5220.

While various embodiments have been particularly shown and described with reference to the drawings, it will be understood that various changes in form and details may be made therein without departing from the spirit and scope of the following claims.

What is claimed is:

1. A memory system comprising:
a memory module configured to store a code word group; and
a memory controller configured to control an operation of the memory module, the memory controller including an error correction code (ECC) engine configured to detect and correct an error of the code word group, wherein the ECC engine includes:

a data-width aware (DWA) encoder configured to generate the code word group including a first data word and a second data word that are received from outside of the memory controller, the second data word being different from the first data word, error correction bits of each of the first data word and the second data word, and a type determination flag indicating a size of each of the first data word and the second data word, and perform an error detection and error correction operation in one of a first mode, a second mode, and a third mode according to a type of the code word group based on the type determination flag, and transmit the code word group that is generated to the memory module; and a DWA decoder configured to receive the code word group from the memory module, perform an error detection and error correction operation in one of the first mode, the second mode, and the third mode according to the type of the code word group determined based on the type determination flag, and extract the first data word and the second data word from the code word group, wherein the type determination flag includes:
a flag F indicating whether the size of each of the first data word and the second data word is greater than a reference bit value; and
a flag N indicating which of the first data word and the second data word has the size that is equal to or less than the reference bit value, when the size of at least one of the first data word and the second data word is equal to or less than the reference bit value, and wherein the DWA decoder determines that the code word group is a fourth type when a number of '0's included in the flag F is a first value or less, determines that the code word group is a second type when a number of '0's included in the flag N is the first value or less, determines that the code word group is a third type when the number of '0's included in the flag N is a second value or less, and determines that the code word group is a first type when the number of '0's included in the flag N is greater than the second value.

2. The memory system of claim 1, wherein:
the DWA encoder and the DWA decoder detect an error of at least four bits and correct an error of at least 3 bits for each of the first data word and the second data word, in the first mode.

3. The memory system of claim 1, wherein:
the DWA encoder and the DWA decoder detect an error of 2 bits and correct an error of 1 bit for a data word greater than the reference bit value, among the first data word and the second data word, and detect an error of at least four bits and correct an error of at least three bits for a data word equal to or less than the reference bit value, in the second mode.

4. The memory system of claim 1, wherein the DWA encoder and the DWA decoder detect an error of 2 bits and correct an error of 1 bit for both the first data word and the second data word, in the third mode.

5. The memory system of claim 1, wherein the flag F has a size of 7 bits, and the flag N has a size of 14 bits.

6. The memory system of claim 1, wherein:
the memory module includes a plurality of memory devices, and
the ECC engine includes:
a bitwise (BW) interleaver configured to receive the code word group from the DWA encoder and transmit bits included in the code word group one-by-one to the plurality of memory devices, while sequentially increasing addresses of the bits, to control each of the plurality of memory devices to store each of the first data word and the second data word; and
a BW deinterleaver configured to sequentially receive the bits of the code word group stored in the plurality of memory devices and recombine the bits to generate a recombined code word group, and transmit the recombined code word group to the DWA decoder.

7. The memory system of claim 1, wherein the memory module includes at least 18 memory devices, and each of the memory devices has a data bus width of 4 bits.

8. An error correction code (ECC) engine comprising:
a data-width aware (DWA) encoder configured to generate a code word group using a first data word and a second data word received from outside the ECC engine, the code word group including the first data word, the second data word, error correction bits of the first data word and the second data word, and a type determination flag indicating a size of each of the first data word and the second data word, and perform an error detection and error correction operation by selecting one of a plurality of error correction modes based on the type determination flag; and a DWA decoder configured to receive the code word group, perform an error detection and error correction operation by selecting one of the plurality of error correction modes based on the type determination flag included in the code word group, and extract the first data word and the second data word from the code word group, wherein the type determination flag including:
a flag F indicating whether the size of each of the first data word and the second data word is greater than a reference bit value, and
a flag N indicating which of the first data word and the second data word has the size that is equal to or less than the reference bit value, when the size of at least one of the first data word and the second data word is equal to or less than the reference bit value, and wherein:
the flag F has a size of 7 bits,
the flag N has a size of 14 bits, and
the DWA decoder:
determines that the sizes of both the first data word and the second data word are greater than the reference bit value when a number of '0's included in the flag F is a first value or less,
determines that only the size of the first data word is equal to or less than the reference bit value when a number of '0's included in the flag N is the first value or less,
determines that only the size of the second data word is equal to or less than the reference bit value when the number of '0's included in the flag N is a second value or less, and
determines that the sizes of both the first data word and the second data word are equal to or less than the reference bit value when the number of '0's included in the flag N is greater than the second value.

9. The ECC engine of claim 8, wherein:
the plurality of error correction modes include:
a first mode in which an error of at least 4 bits is detected and an error of at least 3 bits is corrected for each of the first data word and the second data word;
a second mode in which an error of 2 bits is detected and an error of 1 bit is corrected for a data word greater than the reference bit value, among the first data word and the second data word, and an error of at least 4 bits is detected and an error of at least 3 bits is corrected for a data word equal to or less than the reference bit value; and a third mode in which an error of 2 bits is detected and an error of 1 bit is corrected for each of the first data word and the second data word, and the DWA encoder and the DWA decoder:

select the first mode when the sizes of both the first data word and the second data word are equal to or less than the reference bit value, select the second mode when only the size of one of the first data word and the second data word is equal to or less than the reference bit value, and select the third mode when the sizes of both the first data word and the second data word are greater than the reference bit value.

10. The ECC engine of claim 8, further comprising:

a bitwise (BW) interleaver configured to receive the code word group from the DWA encoder and output bits included in the code word group, while sequentially increasing addresses of the bits; and a BW deinterleaver configured to sequentially receive the bits of the code word group, recombine the bits to generate a recombined code word group, and transmit the recombined code word group to the DWA decoder.

11. An operating method of a memory system, the operating method comprising:

receiving a first data word and a second data word;

generating a code word group including the first data word and the second data word, parity bits for each of the first data word and the second data word, and a type determination flag indicating sizes of the first data word and the second data word;

selecting an error correction mode based on the type determination flag; and performing an error detection and error correction operation in the error correction mode that is selected, wherein the type determination flag includes:

a flag F of 7 bits indicating whether a size of each of the first data word and the second data word is greater than a reference bit value, and a flag N of 14 bits indicating which of the first data word and the second data word has the size that is equal to or less than the reference bit value, when the size of at least one of the first data word and the second data word is equal to or less than the reference bit value, and wherein the selecting of the error correction mode includes:

determining that the code word group is a fourth type when a number of '0's included in the flag F is a first value or less;

determining that the code word group is a second type when a number of '0's included in the flag N is the first value or less;

determining that the code word group is a third type when the number of '0's included in the flag N is a second value or less; and determining that the code word group is a first type when the number of '0's included in the flag N is greater than the second value.

12. The operating method of claim 11, wherein the selecting of the error correction mode includes:

selecting a first mode in which an error of at least 4 bits is detected and an error of at least 3 bits is corrected for each of the first data word and the second data word, when the code word group is the first type;

selecting a second mode in which an error of 2 bits is detected and an error of 1 bit is corrected for a data word greater than the reference bit value, among the first data word and the second data word, and an error of at least 4 bits is detected and an error of at least 3 bits is corrected for a data word equal to or less than the reference bit value, when the code word group is the second type or the third type; and selecting a third mode in which an error of 2 bits is detected and an error of 1 bit is corrected for each of the first data word and the second data word, when the code word group is the fourth type.

13. The operating method of claim 11, further comprising transmitting bits included in the code word group, on which the error detection and error correction operation is performed, one-by-one to a plurality of memory devices, while sequentially increasing addresses of the bits, to control each of the plurality of memory devices to store each of the first data word and the second data word.

* * * * *